United States Patent [19]

Holder

[11] Patent Number: 4,695,120
[45] Date of Patent: Sep. 22, 1987

[54] OPTIC-COUPLED INTEGRATED CIRCUITS

[75] Inventor: James D. Holder, Huntsville, Ala.

[73] Assignee: The United States of America as represented by the Secretary of the Army, Washington, D.C.

[21] Appl. No.: 780,139

[22] Filed: Sep. 26, 1985

[51] Int. Cl.[4] .............................................. G02B 6/12
[52] U.S. Cl. ................... 350/96.11; 136/249; 136/251; 250/212; 250/227; 250/578; 357/19; 357/40; 357/75
[58] Field of Search .......................... 350/96.10, 96.11; 357/17, 19, 30, 40, 74, 75, 85; 250/211 R, 211 J, 212, 216, 227, 578; 136/249, 250, 251, 291, 293

[56] References Cited

U.S. PATENT DOCUMENTS

| 2,944,165 | 7/1960 | Stuetzer | 357/40 X |
| 3,280,333 | 10/1966 | Hyman et al. | 357/40 X |
| 3,535,532 | 10/1970 | Merryman | 357/40 X |
| 3,948,682 | 4/1976 | Bordina et al. | 357/40 X |

FOREIGN PATENT DOCUMENTS

| 53-84586 | 7/1978 | Japan | 350/96.11 |
| 57-45286 | 3/1982 | Japan | 357/40 |
| 58-93268 | 6/1983 | Japan | 357/40 |

Primary Examiner—John Lee
Attorney, Agent, or Firm—Freddie M. Bush; Robert C. Sims

[57] ABSTRACT

Signal/data enters the IC in optic form via an optically-efficient method from either fiber optic or circuit-trace optic waveguides. The optic signal/data is transformed to electrical signal/data via the photo-sensing cells that are illuminated by each channel's photon beam. This electrical signal then is transmitted via a connection to an IC chip which performs the required processing. This IC chip is supplied with electric power by means of a photo-voltaic cell array mounted internal to the IC package. The illumination source of the photo-voltaic array is provided by an optic waveguide that transmits a high intensity photon beam of proper wavelength to yield efficient photon-to-electric current conversion. A portion of this high intensity photon beam is captured by an optic waveguide mounted internal to the IC This optic waveguide conducts the photons to a region where photo-intensity modular cells are located. Each of these modulator cells is connected electrically to the output terminals of the IC and seerves to convert the electrical signal/data to an equivalent optic form by means of modulating a portion of the supplied photons and directing the modulated beam toward the output channel optic waveguide. This optic waveguide then transmits the signal/data to other optic-coupled IC's or transducers, as required.

1 Claim, 5 Drawing Figures

OPTIC-COUPLED INTEGRATED CIRCUITS

DEDICATORY CLAUSE

The invention described herein may be manufactured, used, and licensed by or for the Government for governmental purposes without the payment to me of any royalties thereon.

BACKGROUND OF THE INVENTION

The growing trend in the integrated circuit (IC) field is toward more functions per chip, lower power consumption, and lower operating voltages. These trends have many advantages but also create some problems. The sensitivity of electronic circuits to voltage and current pulses such as electromagnetic interference (EMI), electrostatic discharge (ECD), and electromagnetic pulse (EMP) is well known. The newer IC's are no better in this regard, and may be substantially more susceptable. The lower power and voltage requirements along with recent developments in the optics field open up the possibility of alternate circuit connection technology.

The advent of fiber optics and similar optic waveguides has made possible the assembly of optic circuits as complex as any existing wiring plane or circuit board. Optic sensors are now made with the same technology and materials as used in IC's and low-power optic outputs using reflected light such as liquid crystal displays (LCD) are readily available.

SUMMARY OF THE INVENTION

An optic-coupled IC design uses much of the same techniques and materials as is commnoly used in current IC's. The unique features of the optic-coupled IC are provisions for the entry and exit of the power and signal illumination beams, a photo-voltaic array, an array of photo-sensitive cells, an array of photo-modulator cells, and an optic waveguide. The photo-voltaic array is illuminated by a bright "power beam" to generate electrical power to operate the integrated circuit chip. The photo-sensitive cells act as signal/data receivers and convert the output of the optic waveguide into electrical form to input to the IC chip, the array of photo-modulator cells act as transducers to convert the electrical output signal/data to optic form for transmission through the optic waveguide circuitry. The enclosed optic waveguide serves to conduct illumination from the "power beam" input to the photo-modulator cells to serve as a photon source to be converted to signal/data by the photo-modulators.

DESCRIPTION OF THE BEST MODES AND PERFERRED EMBODIMENTS

The advent of fiber optics and similar optic waveguides has made possible the assembly of optic circuits as complex as any existing wiring plane or circuit board. Optic sensors are now made with the same technology and materials as used in IC's and low-power optic outputs using reflected or transmitted light such as liquid crystal displays (LCD) are readily available. If one were to combine a low power IC with its inputs being optic sensors, its outputs being LCD devices, and the external circuit connections being optic fibers carrying optic signals as opposed to electrical signals, then the input and output circuitry would be completely immune to such disturbances as EMI, ESD, and EMP. There remains, of course, the power system which must be made immune. For some instances, standard filtered power supplies or batteries might be sufficient, but in general this is not the desirable course of action.

A power system for the optic-coupled IC's should be as immune to interference as the signal system. This leads to the consideration of luminous power for the IC's. If there were an optic guide carrying a bright illumination to each chip, a portion would be used as the source light for the LCD (or similar) output devices, and the rest would be used to eliminate the need for electrically-conducting circuit traces and thereby prevent upset of the circuits by penetration of electrical disturbances.

Figure 1:
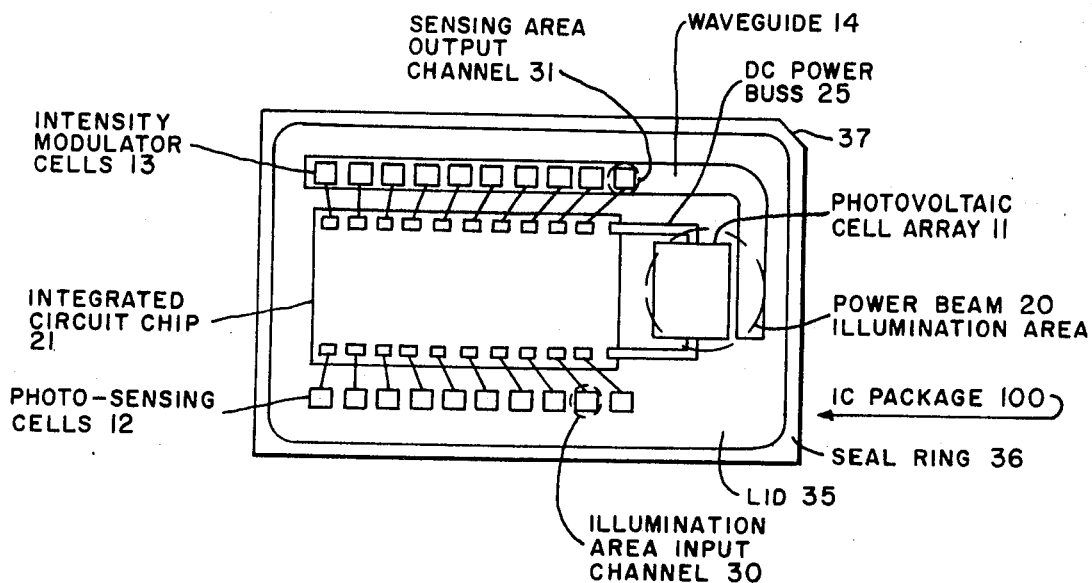
FIG. 1 shows an optic-coupled integrated circuit straight-in style of the present invention.

For such a system, special IC package design, special hardware, and procedures must be developed. FIG. 1 shows the design of a straight-in style optic-coupled IC. This system uses much of the same techniques and materials as is commnly used in current IC's. A lid 35, lid-to-header seal ring 36 and keying notch 37 are provided. The unique features of the optic-coupled IC are provisions for the entry and exit of the power and signal illumination beams via transparent areas in the IC lid (not shown), a photo-voltaic array 11, an array of photo-sensitive cells 12, an array of photo-modulator cells 13, and an internal optic waveguide 14. The photo-voltaic array 11 is illuminated by a bright "power beam" 20 such as generated by any practical lamp (not shown) to generate electrical power in array 11 to operate the integrated circuit chip 21 by way of DC power Buss 25. The photo-sensitive cells 12 act as signal/data receivers which are individually illuminated through the transparent lid 35 by external optic waveguide circuitry (not shown) and converts the optic input into electrical form thereby providing input to the IC chip 21.

The array of photo-modulator cells 13 act as transducers to convert the electrical output signal/data of IC 21 to optic form for transmission through the external optic waveguide circuitry (not shown) to its destination. The internal optic waveguide 14 serves to conduct illumination from the "power beam" 20 input to the photo-modulator cells 13 to serve as a photon source to be converted to signal/data by the photo-modulators. The cells 11, 12 and 13 if of appropriate design, could be fabricated as part of IC 21 or they could be bonded to the IC package 100 and connected via bonded wires.

Figure 2:
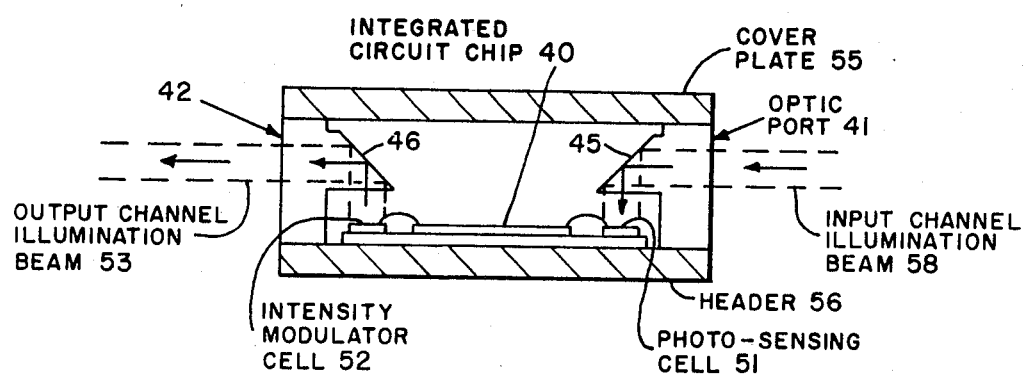
FIG. 2 shows a first optic-coupled integrated circuit edge-on style.

The optic-coupled IC design shown in FIG. 1 is termed "straight-in" style, because, the optic beams enter and exit via transparent lid 35 in a straight line from the external optic waveguide to/from the receiver/transmitter devices 12 and 13. FIG. 2 shows an edgewise cutaway view of an "edge-on" style optic-coupled IC 40. This style incorporates all of the features of the straight-in style with the addition of specialized optic ports 41 and 42 which incorporate a prismatic or mirror reflector 45 and 46 to turn the illumination beams from horizontal, downward toward the IC's interface devices 51 and 52 and vise versa. The optic ports are made of a glassy substance suitable for the bonding process. As shown, a sloped upper surface 45 acts as a mirror to re-direct the light entering, horizontally from input channel illumination beam 58 toward the optic receptors 51 on the IC chip's surface. The different channels may be kept separate by vertical separations made partly through the port from the inside of the IC. On the opposite side, the output transducers 52 communicate to the outside circuits by a similar optical arrangement using mirror or prism 46 to transmit the output channel beam 53. A plurality of identical channels along the length of the IC package are provided. A cover plate 55 and IC header 56 are provided for structural strength and environmental sealing.

Figure 3:
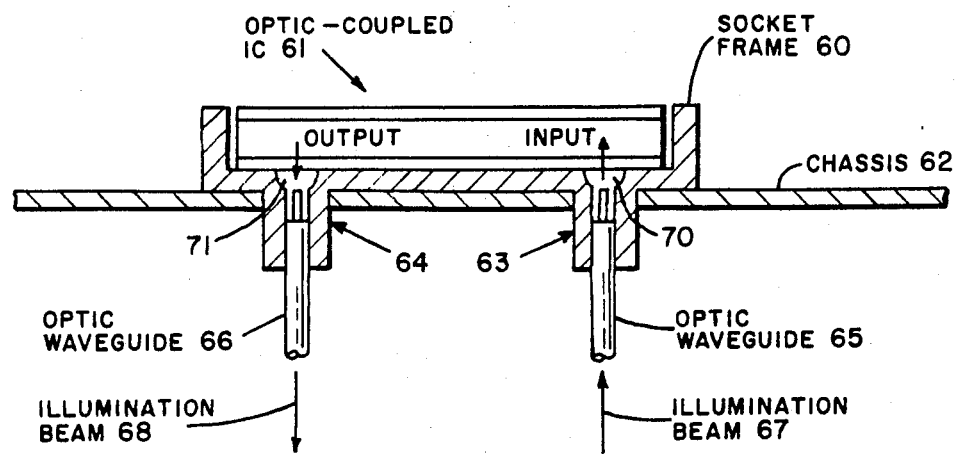
FIG. 3 shows a fiber-optic socket for an optic-coupled integrated circuit straight-in style of the present invention.

FIG. 3 shows a socket for optic-coupled IC's of the straight-in style suitable for the application where the external optic waveguides are fiber-optic bundles. The body 60 of the socket provides mechanical support and restraint for the IC 61 and provides means for mounting the assembly to a base plate or chassis 62. As shown, bosses 63 and 64 penetrate the chassis to provide access for the optic fibers 65 and 66. Transmission of the optic signal/data 67/68 to and from the IC 61 and the end of the optic fibers is facilitated by refractive-index matching systems 70 and 71 such as a transparent putty-like material. This material serves to decrease the signal loss and reflections in the optic path. The socket boss will have some restraining device for the optic fiber such as a friction ridge or spur on its inner diameter, or a clamping system possibly using a thermo-shrink or shape-memory material (not shown).

Figure 4:
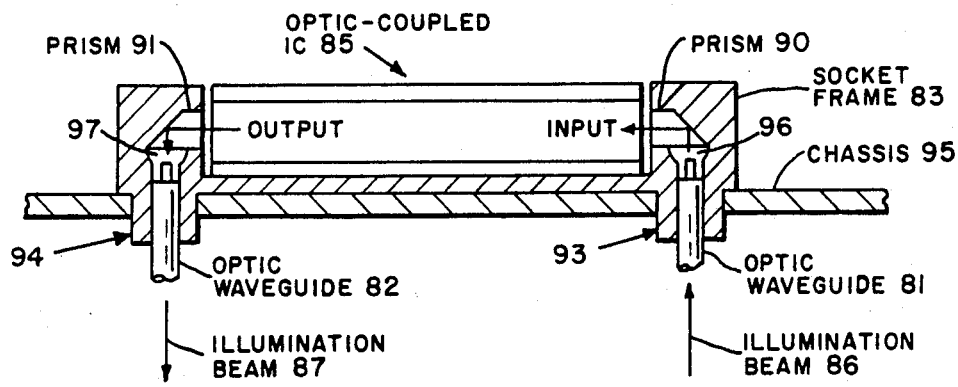
FIG. 4 shows a fiber-optic socket for an optic-coupled integrated circuit, edge-on style of the present invention.

FIG. 4 shows a socket for optic-coupled IC's of the edge-on style for use with fiber-optic external waveguide bundles 81 and 82. The socket body 83 provides all of the above features for mounting the IC package 85, optic fibers 81 and 82, and optic transmission 86 and 87. It also incorporates prismatic or mirror elements 90 and 91 which redirect the optic beam from the vertical orientation of the optic fibers to the horizontal direction required for entry into the IC package and vice versa. Bosses 93 and 94 extend through chassis 95 to accommodate the optic fibers 81 and 82 and matching materials 96 and 97. As in FIG. 4, and FIG. 1 a separate input/output section is provided for each channel of the IC.

Figure 5:
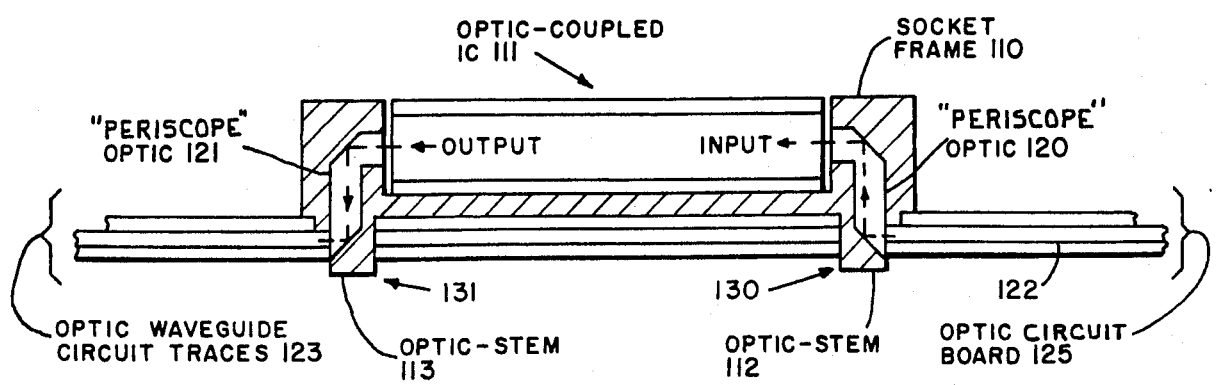
FIG. 5 shows a socket assembly for optic-coupled integrated circuits and optic waveguide circuit board of the present invention.

FIG. 5 shows a socket 110 suitable for the application where the external optic waveguides are optic waveguide traces on a circuit board assembly 125. The operation is identical to the above socket except for the "optic stems". Instead of the optic fiber bosses, stems 112 and 113 extend below the circuit board surface with periscope-like reflector devices 120 and 121. Flat optic waveguide traces 122 and 123 of optical circuit board assembly 125 end at circular pads similar in shape to normal printed-circuit patterns. Central holes 130 and 131 are provided in these pads, and optic stems 112 and 113 are inserted through these holes. The light present in the circuit connection, enters the periscope device 120 and is delivered to the IC 111. Outputs from the IC are treated the same way. Refractive-index matching material can be used in these holes to enable efficient optic transfer. It is possible that the reliability of multi-layer optic circuit boards would be greater than for normal copper-trace multi-layer boards. FIG. 5 shows only a version suitable for the edge-on style IC, it being the more complex design. A version for the straight-in style would have an upper section similar to that shown in FIG. 3.

Application of optic-coupled IC's is much like IC's of normal design. The IC's can be either digital or linear in function, and the internal design of the IC chip is identical to any normal IC of present or advanced design. The exception is, of course, the optic circuitry and signal/data and power conversion systems.

In the operation of FIG. 1, the signal/data enters the IC 100 in optic form via an optically-efficient method from external fiber-optic or circuit-trace optic waveguides (not shown). The optic signal/data is transformed to electrical signal/data via the photo-sensing cells 12 that are illuminated 30 by each channel's photon beam. This electrical signal then is transmitted via connections to an IC chip which performs the required processing. This IC chip is supplied with electric power by means of a photo-voltaic cell array 11 mounted internal to the IC package. The illumination 20 for the photo-voltaic array is provided by a high intensity photon beam of proper wavelength to yield efficient photon-to-electric current conversion. A portion of this high intensity photon beam is captured by an optic waveguide 14 mounted internal to the IC. This optic waveguide conducts the photons to a region where photo-intensity modulator cells 13 are located. Each of these modulator cells is connected electrically by connections to the output terminals of the IC. The electrical signal/data is converted to an equivalent optic form by means of modulating a portion of the supplied photons by cells 13 and directing the modulated beam toward the output channel external optic waveguide (not shown). This optic waveguide then transmits the signal/data to other optic-coupled IC's or transducers, as required.

Variations in the design could be of several forms. One variation would be to use photo-emissive devices (light-emitting diodes or similar) instead of the photo-intensity modulators as a means of converting electrical signal/data to its optic equavalent. Another variation would be to augment the IC chip's electrical processing with optic-circuit processing within the IC package. The transparent lid of the straight-in style and the optic port of the edge-on styles may be fitted with additional optic devices such as lenses or filters for the improvement of transmission characteristics and the exclusion of stray optic energy.

An optic-coupled IC system such as this, if implemented with a full range of hardware, processes, and tools, will make electrical and electronic equipment which is immune to electrical interference much more cost effective than is presesntly the case. An additional possible advantage above that of electrical interference immunity is the lack of speed limitation due to wiring impedance. In many high-speed systems the capacitance and inductance of the signal/data busses limit the speed at which the system can operate due to limitations in the charge delivery capability of the IC's. In the case of the signal/data being in optic form, no such phenomena is present. The packaging costs of the IC's may be reduced due to the fact that no metal connection pins must be brought out. If this is the case, then the problem of sealing packages is eased since there are straight-line seals and less difference in thermal expansion would be experienced. The power (light) to run the IC's may in some applications be already available and not require a dedicated illumination supply.

I claim:

1. A system for an optic-coupled integrated circuit (IC) comprising a plurality of photon sensing devices mounted onto and connected to said IC for providing input signals in response to outside photon information to said IC without any outside electrical or magnetic energy input being involved, a plurality of photon producing devices connected to and being mounted to said IC for providing output photon data information only as outputs of the overall system, a photo-voltaic cell array mounted to and connected to said IC for providing electrical power for said IC in response to outside photon power illumination of said array; and an optical-coupling means mounted to said IC and subject to said power illumination whereby a portion of the illumination is transferred to said photon producing devices so as to provide a base illumination that said photon producing devices will modulate in accordance to outputs transmitted by the IC.

* * * * *